May 6, 1930. M. H. PADE 1,757,732
CONVEYER SYSTEM FOR USE IN HANDLING RUBBER TUBE MANDRELS
Filed Feb. 26, 1925 4 Sheets-Sheet 1
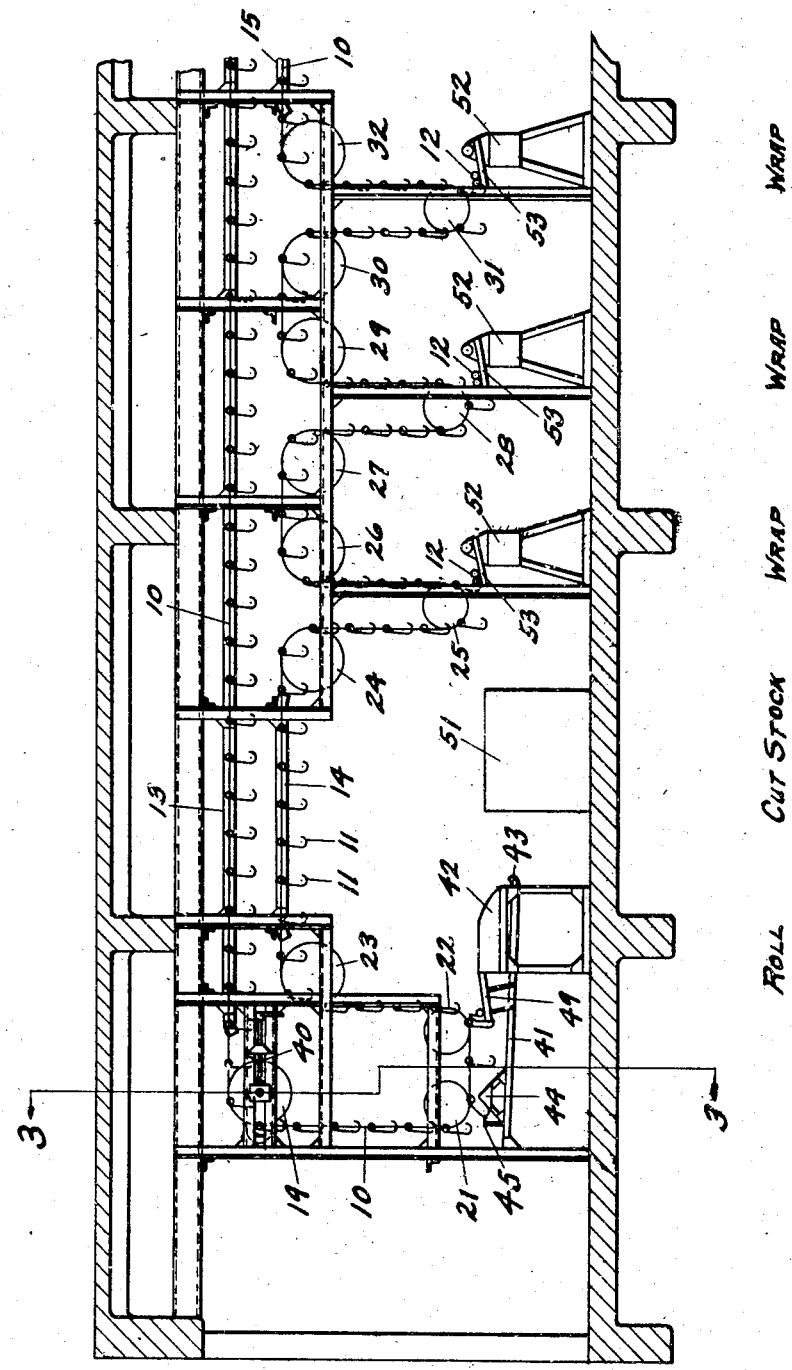
INVENTOR.
MAX H. PADE
BY
ATTORNEY.

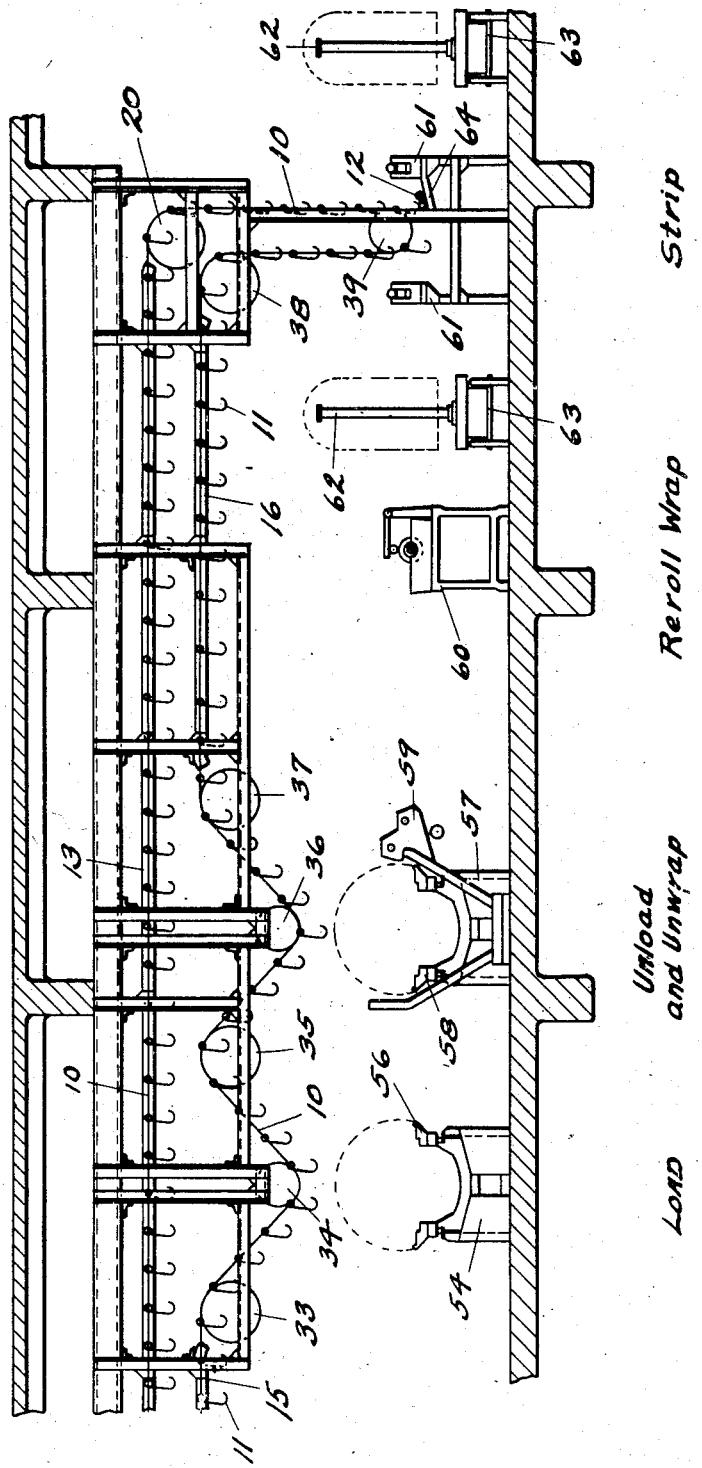

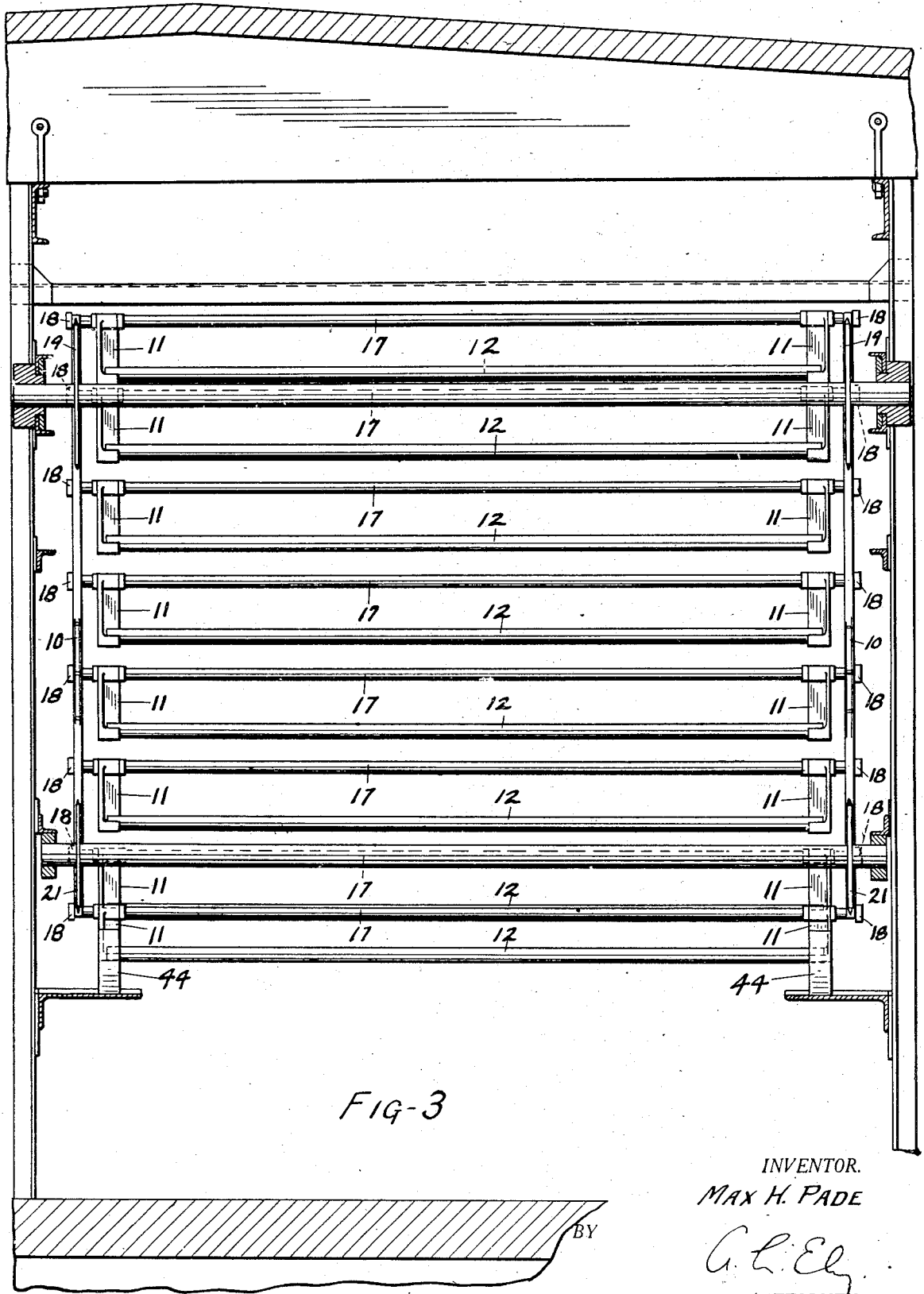

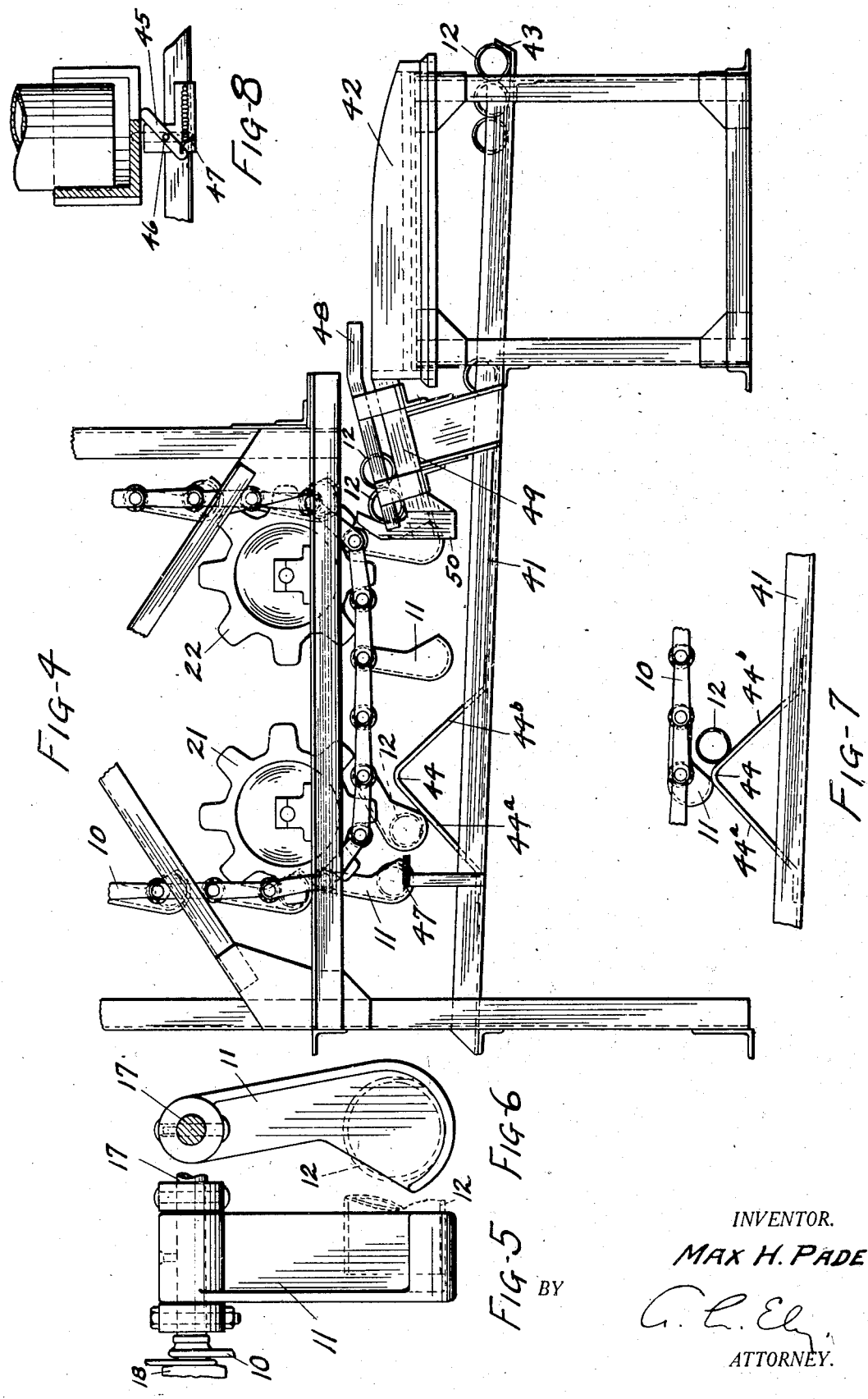

Patented May 6, 1930

1,757,732

UNITED STATES PATENT OFFICE

MAX H. PADE, OF AKRON, OHIO, ASSIGNOR TO THE FIRESTONE TIRE & RUBBER COMPANY, OF AKRON, OHIO, A CORPORATION OF OHIO

CONVEYER SYSTEM FOR USE IN HANDLING RUBBER TUBE MANDRELS

Application filed February 26, 1925. Serial No. 11,741.

This invention relates to conveyer systems for use in handling poles or mandrels on which inner tubes for pneumatic tires or like rubber tubes are vulcanized.

In the art of manufacturing rubber tubes, wide sheets of rubber are wrapped onto hollow poles or mandrels nine or ten feet long, or rubber tubes extruded to shape are slipped onto such poles. The poles are then wrapped with helical convolutions of a narrow strip of fabric to press the tubes against the poles. The poles are then mounted on a truck and run into a suitable heater, such as a steam vulcanizer in which they are cured. They are subsequently run out of the heater and the fabric wrapping is removed. Finally the tubes are stripped from the mandrels and the latter are reused for making other tubes.

The present invention is directed to an improved system for handling the poles between the above described operations. This system includes an endless overhead conveyer arranged to carry the poles past a tube-rolling or applying station, one or more tube wrapping stations, a vulcanizer truck loading station, a vulcanizer truck unloading and wrapper-removing station, a rerolling wrapper station, and a tube-stripping station.

An important object of the invention is to provide means for automatically removing poles from the conveyer at the tube rolling or applying station.

Another object is to provide the above means in combination with means providing for the conveyers automatically picking up of the mandrels having the tubes applied thereon from said station.

Another object is to provide a combined vulcanizer truck unloading and pole unwrapping station.

The foregoing and other objects are obtained by the system illustrated in the accompanying drawings and described below. It is to be understood that the invention is not limited to the specific devices shown and described.

Of the accompanying drawings:

Figures 1 and 2, taken together, illustrate a complete diagrammatic side elevation of a system embodying the invention;

Figure 3 is a transverse section on line 3—3 of Figure 1;

Figure 4 is an enlarged detail side elevation of the system at the tube rolling or applying station;

Figure 5 is an enlarged detail rear elevation of a hook for carrying the poles or mandrels;

Figure 6 is a side elevation thereof;

Figure 7 is a detail side elevation illustrating the manner of removing empty poles from the conveyer at the tube rolling station; and Figure 8 is an enlarged detail illustrating a drag device for cooperation with the hooks at the above station.

Referring to the drawings, 10, 10 represent a pair of spaced conveyer chains carrying hooks 11, 11 arranged in pairs so as to support mandrels or poles 12, 12 between said chains. Chains 10 are arranged to be driven over a single continuous upper track comprising spaced rails 13, 13 supported in suitable framework as shown extending between the floors of a building and over several separate lower tracks including spaced rails 14, 14, 15, 15; and 16, 16 also mounted in said framework. The chains 10 have rods 17, 17 secured thereon so as to extend therebetween to connect the chains together and to provide for pivoting hooks 11 thereon. Rollers 18, 18 are journaled on rods 17 so as to travel on the various tracks.

Chains 10 are trained over sprockets 19, 19 and 20, 20 respectively at opposite ends of track 13 and downwardly under sprockets 21, 21 and 22, 22 at the tube rolling station. From the tube rolling station the chains 10 are trained upwardly over sprockets 23, 23, then over track rails 14, 14, then over sprockets 24, 24 downwardly to a wrapping station where they are trained under sprockets 25, 25. The chains are then trained upwardly over sprockets 26, 26 and 27, 27, then downwardly to a second wrapping station under sprockets 28. They are trained again upwardly over sprockets 29, 29 and 30, 30 and again downwardly to a third wrapping station under sprockets 31 and from thence upwardly over sprockets 32 and along track rails 15, 15.

From track rails 15, 15 the chains 10 again pass downwardly from over sprockets 33, 33 and under sprockets 34, 34 at the vulcanizer truck loading station. From sprockets 34 the chains again pass upwardly over sprockets 35, 35 and then downwardly under sprockets 36, 36 at the vulcanizer truck unloading station. From this station the chains 10 pass upwardly over sprockets 37, 37 onto track rails 16, 16, then over sprockets 38, 38 and downwardly to the tube stripping station under sprockets 39, 39 and from thence upwardly over sprockets 20.

It will be understood that all the above sprockets may be suitably journaled in the framework shown between the floors of the building and that any one or more of them may be driven by suitable power means (not shown) to cause the chains 10 to travel continuously (from left to right over its lower courses) past the various stations shown in Figures 1 and 2. As shown at 40 (Figure 1) suitable means may be provided to tighten up the chains 10 as by adjusting the bearings of sprockets 19, 19.

The tube rolling station

At this station (best shown in Figures 4, 7 and 8) empty poles coming from the stripping station over the upper course of the conveyer are removed and supplied to the tube rolling operatives. For this purpose a track comprising spaced rails 41, 41 sloping to the right is arranged under sprockets 21 and 22 and under the course of the conveyer 10 therebetween, the track 41 extending to the right of said conveyer at this station under a tube rolling table 42. Two operatives usually roll the sheets of stock onto the mandrels at this table, the operatives working at the front of the table (shown at the right thereof in Figure 1). Accordingly the tracks 41 extend under the table 42 to the front thereof and stops are provided at 43 to hold mandrels on the tracks 41 in readiness to be removed by the tube rolling operatives.

For removing the mandrels 12 from the conveyer 10, hook-tilting cam rails 44, 44 are provided on tracks 41, the rails 44 being provided with an upwardly inclined portion 44ᵃ for tilting the hooks 11 and a downwardly sloping portion 44ᵇ down which the mandrels 12 may roll out of engagement with the tilted hooks 11 and onto the tracks 41, whereby they roll by gravity to the tube rolling table 42. To prevent accidental releasing of the mandrels 12 from the hooks by swinging of the latter against the rails 44 to result in the mandrels rolling down portion 44ᵃ of the rails, devices for retarding any such swinging action is provided. These devices include a pair of arms 45, 45 pivoted as at 46 on both sides of the conveyer frame and urged by a tensile spring 47 into contact with the sides of the hooks 11 as they pass into engagement with the mandrel removing element 44.

The table 42 is of a type heretofore employed in the art and which will not be described here. A device for feeding the mandrels having the green tubes thereon onto the conveyer is arranged on the rear side of table 42 and consists in spaced guide rails indicated at 48 between which the mandrels are rolled by the tube applying operatives and which are arranged to guide the mandrels onto a sloping track 49 extending into the path of conveyer 10 and having stop elements 50 thereon to position a mandrel so that it will be engaged and picked up by an empty pair of hooks.

Adjacent table 42 there is arranged a stock cutting table 51 on which stock for the tubes is cut to the proper length by tube stock cutting operatives. The conveyer 10 passes over this table on track 14.

The tube wrapping stations

The next or tube wrapping stations have suitable tube wrapping machines indicated at 52, 52 installed respectively adjacent sprockets 25, 28 and 31. An operative is at each station for removing the mandrels having green tubes thereon from conveyer 10 applying the wrappings and placing the wrapped mandrels on downwardly sloping tracks indicated at 53, 53 these tracks being of similar construction to track 49 so as to feed the wrapped mandrels back onto the conveyer 10.

The loading station

At this station which is situated below sprocket 34, a track 54 is provided onto which an empty vulcanizer truck 56 may be run, and arranged so that an operative may remove the mandrels having wrapped tubes thereon and place them on the vulcanizer truck.

The unloading and unwrapping station

This station is located below sprockets 36 and consists in a track 57 similar to track 54 onto which a truck 58 containing mandrels having vulcanized tubes thereon as they come from the heaters may be run, so that an operative may remove the mandrels therefrom. An unwrapping device 59 is also provided at this station for removing the wrappings on the vulcanized tubes so that the mandrels can be mounted onto the conveyer 10 and carried to the stripping station. Between the unloading and unwrapping station and the stripping station a suitable device indicated at 60 is arranged for rerolling the wrapping strips in preparation for reuse at the wrapping stations.

The stripping station

This station is located on both sides of sprocket 39, and includes suitable stripping devices 61, 61 at which operatives work in pairs to strip the tubes in the usual manner and mount them over racks 62, 62 carried by trucks 63, 63 stationed adjacent the strippers. An inclined track 64 is provided at the strippers for feeding the empty mandrels back onto the conveyer 10 in the manner of track 49, whereby they are carried along the upper course of conveyer 10 back to the tube-rolling station.

The operation of the system which will be apparent from the foregoing description may be briefly summarized as follows:—

Conveyer 10 travels continuously and comparatively slowly. Empty mandrels are carried along the upper course thereof to the left (Figure 1) and then downwardly and to the right, the conveyer carrying hooks 11 into engagement with devices 44. The mandrels are removed from the conveyer by devices 44 and deposited onto track 41 down which they roll under table 42 against stop 43.

The rolling operatives pick a sheet of cut stock from table 51, place it on table 42, remove a mandrel 12 from track 41, roll the sheet of stock onto the mandrels, adding onto the stock, the usual labels and valve reinforcing elements and then roll the mandrel onto track 49 down which they roll into engagement with stops 50 and which mandrels are picked up in succession by hooks 11.

From the rolling station the mandrels travel to the wrapping stations, the various operatives removing the mandrels from the conveyer, apply the wrappings and then placing the mandrels on tracks 53 from which they are picked in succession by the conveyer hooks.

The wrapped mandrels are conveyed next to the loading station where they are removed in succession by operatives and placed in the vulcanizer truck 56. After vulcanization they are placed onto truck 58 and carried to the unloading station by being run in on truck 57. It will be understood that the vulcanizing operations are so timed that an empty truck will always be moved onto track 54 immediately after a filled one is removed therefrom and a truck filled with mandrels having vulcanized tubes thereon will be ready immediately to be run onto track 57 as an empty truck 58 is removed therefrom.

At the unloading station an operative removes the mandrels in succession from truck 58 and unwraps them on unwrapping device 59. He places the mandrels having the vulcanized tubes thereon onto conveyer 10 and they pass to the stripping station where they are removed by the stripping operatives, are stripped of the tubes, and placed onto track 64 from which they are picked in succession by conveyer 10 and carried back to the rolling station for reuse. The vulcanized tubes are hung onto racks 62 which are removed and replaced as they become filled.

Modifications of the invention may be resorted to without departing from the spirit thereof or the scope of the appended claims.

What is claimed is:

1. Apparatus for handling tube mandrels comprising a conveyer including spaced pivoted hooks for carrying the mandrels, a station past which the conveyer travels, and automatic means at the station for removing the mandrels from the conveyer, said means including an upwardly inclined track for engaging and tilting the hooks and a downwardly sloping track on which the mandrels can roll from said tilted hooks.

2. Apparatus for handling tube mandrels comprising a conveyer including spaced pivoted hooks for carrying the mandrels, a station past which the conveyer travels, automatic means at the station for removing the mandrels from the conveyer, said means comprising a track having an upwardly inclined portion and a downwardly sloping portion, and a gravity conveyer adapted to receive mandrels from said automatic means.

3. The combination with a traveling conveyer, including series of pendulous hooks arranged in pairs for supporting cylindrical objects, of means for engaging said hooks and tilting the same, comprising inverted V-shaped members in the paths of the hooks, the inclined portions of the members being designed to hold the hooks tilted until the objects can roll off the hooks on the sloping portions of the members.

MAX H. PADE.